(12) United States Patent
Nakae et al.

(10) Patent No.: US 8,938,990 B2
(45) Date of Patent: Jan. 27, 2015

(54) METHOD FOR PRODUCING GLASS SUBSTRATE FOR INFORMATION STORAGE MEDIUM, AND INFORMATION STORAGE MEDIUM

(75) Inventors: Hazuki Nakae, Kyoto (JP); Toshiharu Mori, Osaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/876,569

(22) PCT Filed: Sep. 13, 2011

(86) PCT No.: PCT/JP2011/070825
§ 371 (c)(1),
(2), (4) Date: Mar. 28, 2013

(87) PCT Pub. No.: WO2012/043214
PCT Pub. Date: Apr. 5, 2012

(65) Prior Publication Data
US 2013/0189546 A1    Jul. 25, 2013

(30) Foreign Application Priority Data
Sep. 30, 2010  (JP) ................................. 2010-221538

(51) Int. Cl.
*G11B 5/00*    (2006.01)
*G11B 5/84*    (2006.01)
(Continued)

(52) U.S. Cl.
CPC .............. *G11B 5/8404* (2013.01); *C03C 19/00* (2013.01); *C03C 21/002* (2013.01)
USPC ............ 65/30.1; 451/41; 428/846.9; 428/410

(58) Field of Classification Search
CPC ...... C03C 15/02; C03C 15/025; C03C 19/00; C03C 25/005; C03C 21/002; G11B 5/8404
USPC ......... 428/828, 848.9, 42, 64.4, 64.36, 846.9, 428/410; 501/63, 64, 69, 70; 65/30.14, 65/30.1; 451/41; 423/263; 51/309
See application file for complete search history.

(56) References Cited

U.S. PATENT DOCUMENTS 6,329,309 B1   12/2001   Kanamaru et al.
6,602,111 B1   8/2003    Fujie et al.
(Continued)

FOREIGN PATENT DOCUMENTS

EP    0654445    * 11/1994  ............... C01F 17/00
JP    2864451    * 10/1998  ............... C09K 3/14
(Continued)

OTHER PUBLICATIONS

Translation JP 2864451 Mintsui Mining Oct. 1998.*
(Continued)

*Primary Examiner* — Kevin M. Bernatz
*Assistant Examiner* — Louis Falasco
(74) *Attorney, Agent, or Firm* — Brinks Gilson & Lione (57) ABSTRACT

For an information storage medium a glass substrate is produced in a method including the steps of: polishing a glass substrate with a polishing agent applied thereon; and subsequently, chemically strengthening a major surface of the glass substrate. The polishing agent contains cerium oxide at a purity equal to or larger than 99% by mass for $CeO_2$/TREO, and has an alkaline earth metal content having a total mass equal to or smaller than 10 ppm by mass. The step of polishing is performed with a soft polishing pad to polish the glass substrate.

7 Claims, 5 Drawing Sheets

(51) Int. Cl.
*C03C 19/00* (2006.01)
*C03C 21/00* (2006.01)

(56) References Cited

U.S. PATENT DOCUMENTS

| | | | |
|---|---|---|---|
| 2002/0064620 A1* | 5/2002 | Mitani et al. | 65/102 |
| 2002/0121110 A1* | 9/2002 | Saito et al. | 65/30.14 |
| 2003/0031878 A1* | 2/2003 | Mitani et al. | 428/426 |
| 2003/0162482 A1* | 8/2003 | Okuhata et al. | 451/41 |
| 2004/0231246 A1* | 11/2004 | Ferranti et al. | 51/309 |
| 2005/0287931 A1* | 12/2005 | Saegusa et al. | 451/41 |
| 2006/0062129 A1* | 3/2006 | Saito et al. | 369/272.1 |
| 2006/0188756 A1* | 8/2006 | Kezuka et al. | 428/846.9 |
| 2009/0286454 A1* | 11/2009 | Kezuka et al. | 451/41 |
| 2010/0167059 A1* | 7/2010 | Hashimoto et al. | 428/410 |
| 2010/0167091 A1* | 7/2010 | Tachiwana et al. | 65/30.14 |
| 2011/0006251 A1* | 1/2011 | Chinone et al. | 423/263 |
| 2011/0011833 A1* | 1/2011 | Goto et al. | 451/41 |

FOREIGN PATENT DOCUMENTS

| | | |
|---|---|---|
| JP | 2000-169181 A | 6/2000 |
| JP | 2001-089748 A | 4/2001 |
| JP | 2002-109727 A | 4/2002 |
| JP | 2005-293840 A | 10/2005 |
| JP | 2008-088325 A | 4/2008 |
| JP | 2010-030041 A | 2/2010 |

OTHER PUBLICATIONS

International Search Report for International Application No. PCT/JP2011/070825 dated Dec. 13, 2011, 2 pages.

* cited by examiner

| POLISHING AGENTS USED | CeO2/TREO (%) | ALKALINE EARTH METAL CONTENT (ppm) | DETAILS OF ALKALINE EARTH | | | |
|---|---|---|---|---|---|---|
| | | | Mg(ppm) | Ca(ppm) | Ba(ppm) | Sr(ppm) |
| POLISHING AGENT 1 | 99.00 | 9.1 | 0.6 | 7.6 | 0.8 | 0.1 |
| POLISHING AGENT 2 | 99.00 | 5.3 | 0.5 | 4.2 | 0.5 | 0.1 |
| POLISHING AGENT 3 | 99.99 | 2.5 | 0.3 | 1.9 | 0.2 | 0.1 |
| POLISHING AGENT 4 | 98.00 | 3.9 | 0.4 | 3.1 | 0.3 | 0.1 |
| POLISHING AGENT 5 | 99.00 | 10.5 | 1.2 | 8.5 | 0.7 | 0.1 |
| POLISHING AGENT 6 | 66.00 | 45.2 | 15.1 | 27.2 | 2.9 | 0.0 |

Ce SUBSTRATE    Be & Ra UNDETECTED

FIG.6

| NAMES OF SUBSTRATES | | GLASS SUBSTRATE A | GLASS SUBSTRATE B |
|---|---|---|---|
| CONTENT RATIO | | wt% | wt% |
| $Li_2O$ | ALKALI COMPONENTS | 3.5 | 4.0 |
| $Na_2O$ | | 10.0 | 11.5 |
| $K_2O$ | | 0.5 | 0.5 |
| MgO | ALKALINE EARTH COMPONENTS | 0.5 | 1.0 |
| CaO | | 1.5 | 2.5 |
| SrO | | 0.5 | — |
| BaO | | 1.0 | — |
| ZnO | | 0.5 | — |
| $B_2O_3$ | FOAMER COMPONENTS | 0.5 | — |
| $Al_2O_3$ | | 14.5 | 15.0 |
| $SiO_2$ | | 64.5 | 65.5 |
| $TiO_2$ | | — | — |
| $ZrO_2$ | | 2.0 | — |
| $SnO_2$ | | — | — |
| $P_2O_5$ | | — | — |
| $La_2O_3$ | | — | — |
| $CeO_2$ | | 0.5 | — |
| $Nb_2O_5$ | | — | — |
| $Sb_2O_3$ | | — | — |
| TOTAL | | 100.0 | 100.0 |

FIG.7

| | POLISHING AGENTS USED | PAD | GLASS SUBSTRATE | IONIC CONTAMINATION (ng/cm²) | ASSESSMENT | | | |
|---|---|---|---|---|---|---|---|---|
| | | | | | WORKING RATE | ERROR COUNT | ERROR ASSESSMENT | ASSESSMENT |
| PRESENT EXAMPLE 1 | POLISHING AGENT 1 | SUEDE | GLASS SUBSTRATE A | 8 | 1.2 | 32 | ○ | B |
| PRESENT EXAMPLE 2 | POLISHING AGENT 2 | SUEDE | GLASS SUBSTRATE A | 3 | 1.2 | 28 | ○ | B |
| PRESENT EXAMPLE 3 | POLISHING AGENT 3 | SUEDE | GLASS SUBSTRATE A | 2 | 1.3 | 15 | ◎ | A |
| PRESENT EXAMPLE 4 | POLISHING AGENT 1 | SUEDE | GLASS SUBSTRATE B | 7 | 1.1 | 71 | ○ | B |
| PRESENT EXAMPLE 5 | POLISHING AGENT 3 | SUEDE | GLASS SUBSTRATE B | 4 | 1.2 | 54 | ○ | B |
| PRESENT EXAMPLE 6 | POLISHING AGENT 3 | SUEDE | GLASS SUBSTRATE A | 12 | 1.3 | 62 | ○ | B |
| COMPARATIVE EXAMPLE 1 | POLISHING AGENT 1 | FOAMED URETHANE PAD (HARD) | GLASS SUBSTRATE A | 8 | 1.5 | 205 | × | C |
| COMPARATIVE EXAMPLE 2 | POLISHING AGENT 6 | FOAMED URETHANE PAD (HARD) | GLASS SUBSTRATE B | 67 | 1 | 324 | × | C |
| COMPARATIVE EXAMPLE 3 | POLISHING AGENT 4 | SUEDE | GLASS SUBSTRATE A | 8 | 1.1 | 101 | × | C |
| COMPARATIVE EXAMPLE 4 | POLISHING AGENT 5 | SUEDE | GLASS SUBSTRATE A | 20 | 1.2 | 125 | × | C |

…

METHOD FOR PRODUCING GLASS SUBSTRATE FOR INFORMATION STORAGE MEDIUM, AND INFORMATION STORAGE MEDIUM

TECHNICAL FIELD

The present invention relates to a method for producing a glass substrate for an information storage medium and the information storage medium, and more specifically to a method for producing a glass substrate that is used to produce an information storage medium and the information storage medium including that glass substrate.

BACKGROUND ART

There is an increasing demand for hard disk drives of higher density and information storage media as a prime product are also required to have a medium recording surface of high precision and high quality in order to achieve high recording density. A main component thereof is a glass substrate for hard disks, and accordingly, it is also essentially required to have high quality.

Glass substrates for hard disks are produced in a method including a polishing process to ensure high geometrical surface accuracy, and to effectively provide surface morphology in different frequency ranges, such as surface roughness, fine undulation and undulation, slurries and polishing pads having different working abilities have been effectively combined to provide a polishing process having two or more steps to achieve quality in geometry of significantly high accuracy.

The polishing process is generally divided into coarse polishing and precision polishing, and the coarse polishing is done with a polishing agent containing cerium oxide (60%) as a main component. In recent years, a polishing agent of cerium oxide of high purity has been developed, and it allows improved working rates and reduced flaws.

On the other hand, hard disk drives are required to have further higher density, and to achieve high recording density, a magnetic head has introduced therein a technique referred to as a dynamic flying height (DFH) mechanism. More specifically, on a head slider surface a recording and reproducing element is alone extended from a controlled flying height through thermal expansion toward a surface of a medium to achieve a further shorter effective distance and an increased magnetic signal intensity to thus allow a configuration of higher density to also achieve a significantly steady recording and reproduction. Furthermore, hard disk drives are increasingly mounted in mobile equipment, vehicles and the like and thus applied in more fields, and accordingly, increasingly required to be reliable in strength including non-operating shock resistance.

Japanese Patent Laying-Open No. 2010-030041 (PTL 1) and Japanese Patent Laying-Open No. 2008-088325 (PTL 2) disclose using a polishing agent of cerium of high purity. Using a polishing agent of cerium of high purity is expected to contribute to an increased polishing rate, reduced flaws, and the like.

Japanese Patent Laying-Open No. 2002-109727 (PTL 3) describes a method using cerium of high purity as a polishing agent to polish a substrate. The polishing agent disclosed does not contain fluorine.

When cerium oxide is used to provide coarse polishing, a hard and significantly efficient pad, such as a cerium oxide containing, foamed polyurethane pad, that can ensure a high working rate is used for the purpose of shaping as well as removing a surface layer damaged in a lapping step or a similar preworking step.

However, as hard and coarse particles of cerium oxide are contained, the polishing pad per se provides mechanical damage, and the coarse polishing step using cerium oxide per se cannot provide a completely homogenous and uniform surface.

On the other hand, conventionally, to provide a substrate enhanced in shock resistance, a slurry of fine cerium oxide, colloidal silica, zirconium or the like is used to perform a final polishing step and subsequently an ion exchange reaction of an alkaline element is utilized to perform a chemical strengthening process. However, as media have increased recording densities, it is now essential to reduce/prevent defects adhering to a surface of a substrate, and accordingly, it is now a mainstream that the chemical strengthening process is followed by a finishing step to polish approximately 2 μm or smaller.

CITATION LIST

Patent Literature

PTL 1: Japanese Patent Laying-Open No. 2010-030041
PTL 2: Japanese Patent Laying-Open No. 2008-088325
PTL 3: Japanese Patent Laying-Open No. 2002-109727

SUMMARY OF INVENTION

Technical Problem

When the polishing step with cerium oxide is followed by the chemical strengthening process, the workpiece is held in a temperature range around 400 degrees centigrade for 30 minutes or longer. This results in thermal energy significantly contributing to grown and spread residual damage, ion exchange stress significantly facilitating abnormal undulation frequency, and the like, and this cannot be sufficiently corrected by the subsequent, finishing, polishing step.

As a result, a latest hard disk drive system that has the DFH mechanism introduced therein and is thereby controlled to extremely fly low has a rapidly increased rate of less reliable recording and reproduction such as late-coming error.

On the other hand, improving hard disk drives to be reliable in strength including non-operating shock resistance is increasingly accelerated as they are introduced in a variety of industrial equipment, drive recorders and the like, and the chemical strengthening process is now essential in ensuring that a glass substrate is reliably strong.

Herein, the coarse polishing step using cerium oxide is generally performed with a hard pad. This, however, provides a poor polishing rate (or poor production efficiency), and accordingly, the coarse polishing step may be done with a soft pad (or a soft polisher).

Furthermore, while the glass substrate undergoes the chemical strengthening process, the glass substrate may nonetheless fail to have a surface entirely uniformly strengthened. This is because when the coarse polishing step is performed with cerium oxide, cerium oxide chemically reacts with the glass substrate.

Specifically, an aluminosilicate glass substrate containing $SiO_2$ in a relatively large amount has $SiO_2$ with Si and O bonded via a covalent bond, while Ce has an electronic state that approximates to that of Si to some extent. Accordingly, $SiO_2$ has Si easily substituted by Ce. However, a Ce—O bond does not have as large covalent bondability as a Si—O bond, and accordingly, the substituted portion is destroyed by small external force and the glass substrate will have a surface with minute irregularity.

Thus the glass substrate having undergone the coarse polishing step has a surface with minute irregularity, and subjecting the coarsely polished glass substrate to the chemical strengthening process may not strengthen the glass substrate's entire surface uniformly.

In recent years, glass substrates for information storage media are required to have shock resistance, and accordingly, they are required to have enhanced shock resistance, and accordingly, to undergo the chemical strengthening process to have a surface entirely, uniformly strengthened.

The present invention has been made in view of the above, and it contemplates a method for producing a glass substrate for an information storage medium that can provide enhanced shock resistance, and the information storage medium including that glass substrate.

Solution to Problem

The present invention provides a method for producing a glass substrate for an information storage medium including a glass substrate and a magnetic recording layer on a major surface of the glass substrate. The method includes the steps of: polishing the glass substrate with a polishing agent applied thereon; and after the step of polishing, chemically strengthening the major surface of the glass substrate. The polishing agent contains cerium oxide at a purity equal to or larger than 99% by mass for $CeO_2$/TREO and has an alkaline earth metal content having a total mass equal to or smaller than 10 ppm by mass. The step of polishing is performed with a soft polishing pad to polish the glass substrate.

Note that, in the present invention, TREO (total rare earth oxide) means a total amount of rare earth oxide element/elements in a polishing agent, and $CeO_2$/TREO represents a proportion of cerium oxide to a total amount of a rare earth oxide element/elements in a polishing agent.

Furthermore, in the present invention, alkaline earth metal represents Group II elements, and it is a general term of beryllium, magnesium, calcium, strontium, barium, and radium.

In another form the glass substrate has a composition including 0.02-1% by mass of Ce. Preferably the glass substrate has a composition including 0.05-0.8% by mass, more preferably 0.1-0.6% by mass of Ce.

In another form the polishing agent contains cerium oxide at a purity equal to or larger than 99.99% by mass for $CeO_2$/TREO and has an alkaline earth metal content having a total mass equal to or smaller than 5 ppm by mass.

In another form the polishing agent has a solid content with cerium oxide contained therein at a ratio equal to or larger than 90% by mass relative to the solid content.

In another form the polishing agent has a particle diameter having a maximum value equal to or smaller than 3.5 μm and a mean particle diameter (a D50 value) of 0.4-1.6 μm.

In another form a polishing slurry having a moisture content and containing the polishing agent dispersed in the moisture content is employed and the polishing slurry contains 3-15% by mass of cerium oxide.

In another form the soft polishing pad includes a base and a nap layer and the nap layer has a thickness of 430-620 μm.

In another form the method includes the step of cleaning the glass substrate that has been polished, so that a total amount of alkaline earth metal that remains on its entire surface including the major surface and a circumferential surface is equal to or smaller than 10 $ng/cm^2$.

The present invention provides an information storage medium including: a glass substrate obtained by the above described method for producing a glass substrate for an information storage medium; and a magnetic thin film layer provided on the major surface of the glass substrate.

Advantageous Effects of Invention

The present invention can thus provide a method for producing a glass substrate for an information storage medium that can provide enhanced shock resistance, and the information storage medium including that glass substrate.

DESCRIPTION OF EMBODIMENTS

Hereinafter reference will be made to the drawings to describe the present invention in embodiment(s). In describing the following embodiment(s) when numbers, amounts and the like are referred to, the present invention is not limited thereto in scope, unless otherwise indicated. In describing the following embodiment(s), identical or corresponding components are identically denoted and may not be described repeatedly.

Glass Substrate 1 and Magnetic Disk 10

Figure 1:
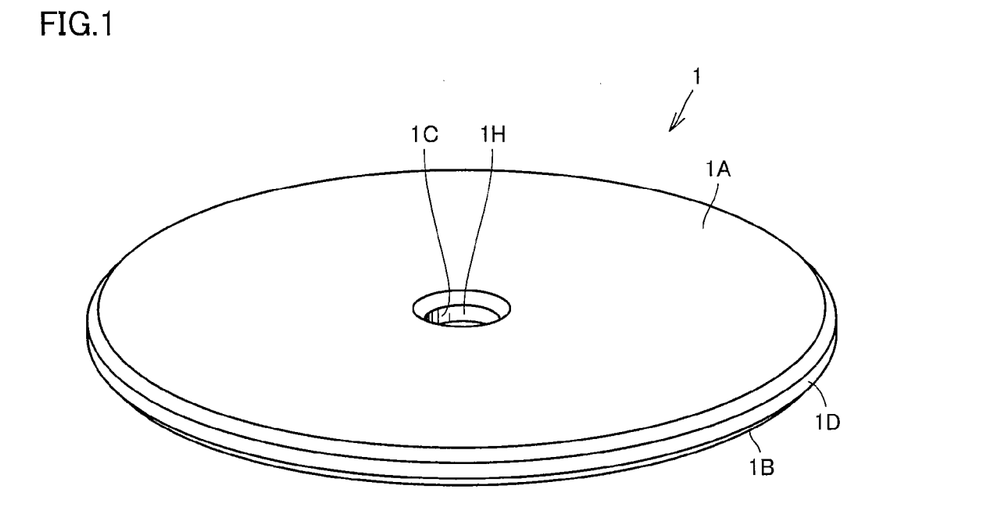
FIG. 1 is a perspective view of a glass substrate obtained by a method for producing a glass substrate in an embodiment.
Figure 2:
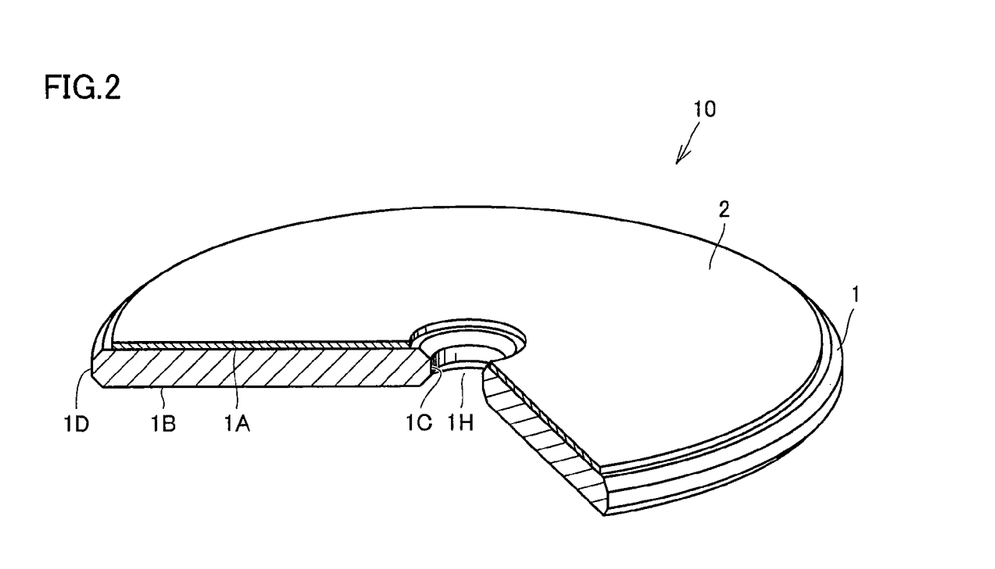
FIG. 2 is a perspective view of a magnetic disk including a glass substrate obtained by a method for producing a glass substrate in an embodiment.

Reference will initially be made to FIG. 1 and FIG. 2 to describe a glass substrate 1 obtained by a method for producing a glass substrate for an information storage medium, as based on the present embodiment, and a magnetic disk 10 including glass substrate 1. FIG. 1 is a perspective view of glass substrate 1 used for magnetic disk 10 (see FIG. 2). FIG. 2 is a perspective view of magnetic disk 10 serving as an information storage medium and including glass substrate 1.

As shown in FIG. 1, glass substrate 1 used for magnetic disk 10 (a glass substrate for an information storage medium) is an annular disk having a center with a hole 1H. Glass substrate 1 has a front major surface 1A, a back major surface 1B, an inner circumferential surface 1C, and an outer circumferential surface 1D.

Glass substrate 1 has a size for example of 0.8 inch, 1.0 inch, 1.8 inches, 2.5 inches, or 3.5 inches. The glass substrate has a thickness for example of 0.30-2.2 mm to prevent damage. In the present embodiment the glass substrate has a size with an outer diameter of approximately 64 mm, an inner diameter of approximately 20 mm and a thickness of approximately 0.8 mm. The glass substrate's thickness is calculated by averaging values measured on the glass substrate at a plurality of any points that are in point symmetry.

As shown in FIG. 2, magnetic disk 10 is configured of glass substrate 1 and a magnetic thin film layer 2 on glass substrate 1 at front major surface 1A. While FIG. 2 shows magnetic thin film layer 2 provided only on front major surface 1A, magnetic thin film layer 2 may also be provided on back major surface 1B.

Magnetic thin film layer 2 is provided by spin-coating the glass substrate 1 front major surface 1A with thermosetting resin having magnetic particles dispersed therein. Magnetic thin film layer 2 may be provided on glass substrate 1 at front major surface 1A by sputtering, nonelectrolytic plating, or the like.

Magnetic thin film layer 2 is provided on glass substrate 1 at front major surface 1A to have a thickness of approximately 0.3-1.2 μm in the case of spin coating, a thickness of approximately 0.04-0.08 μm in the case of sputtering, and a thickness of approximately 0.05-0.1 μm in the case of nonelectrolytic plating. To be thin film and have high density, it is recommendable that magnetic thin film layer 2 be provided by sputtering or nonelectrolytic plating.

Magnetic thin film layer 2 may be formed of any magnetic material and can be formed of conventionally known material. Suitably, however, it is formed of a Co based alloy based on Co, which has high crystalline anisotropy allowing high coercivity, with Ni, Cr and/or the like added for adjusted residual magnetic flux density. Furthermore, a FePt based material may be used as a material for a magnetic layer that is suitable for thermally assisted recording.

Magnetic thin film layer 2 may have a surface coated with a thin layer of a lubricant to help a magnetic recording head to slide. The lubricant is for example a liquid lubricant of perfluoropolyether (PFPE) diluted with a Freon based or similar solvent.

Furthermore, an underlying layer and/or a protection layer may be provided as required. When magnetic disk 10 is provided with an underlying layer, it is selected depending on a magnetic film. The underlying layer is formed for example of at least one type of material selected from Cr, Mo, Ta, Ti, W, V, B, Al, Ni, or a similar non-magnetic metal.

Furthermore, the underlying layer is not limited to a single layer, and may be a multilayer structure of layers of a single type or different types. For example, it may be an underlying layer formed of multiple layers such as Cr/Cr, Cr/CrMo, Cr/CrV, NiAl/Cr, NiAl/CrMo, NiAl/CrV or the like.

To protect magnetic thin film layer 2 against wear and corrosion, a protection layer is provided, such as a Cr layer, a Cr alloy layer, a carbon layer, a hydrogenated carbon layer, a zirconium layer, a silica layer or the like. The protection layer can be provided together with the underlying layer, the magnetic film and the like successively by an in-line type sputtering device. Furthermore, the protection layer may be a single layer or may be a multilayer structure of layers of a single type or different types.

The protection layer may underlie or be replaced with another protection layer. For example, the protection layer may be replaced with a silicon oxide ($SiO_2$) layer, as follows: On a Cr layer, tetraalkoxysilane is diluted with an alcohol based solvent and therein fine particles of colloidal silica are dispersed and applied, and furthermore, fired.

Method for Producing Glass Substrate

Figure 3:
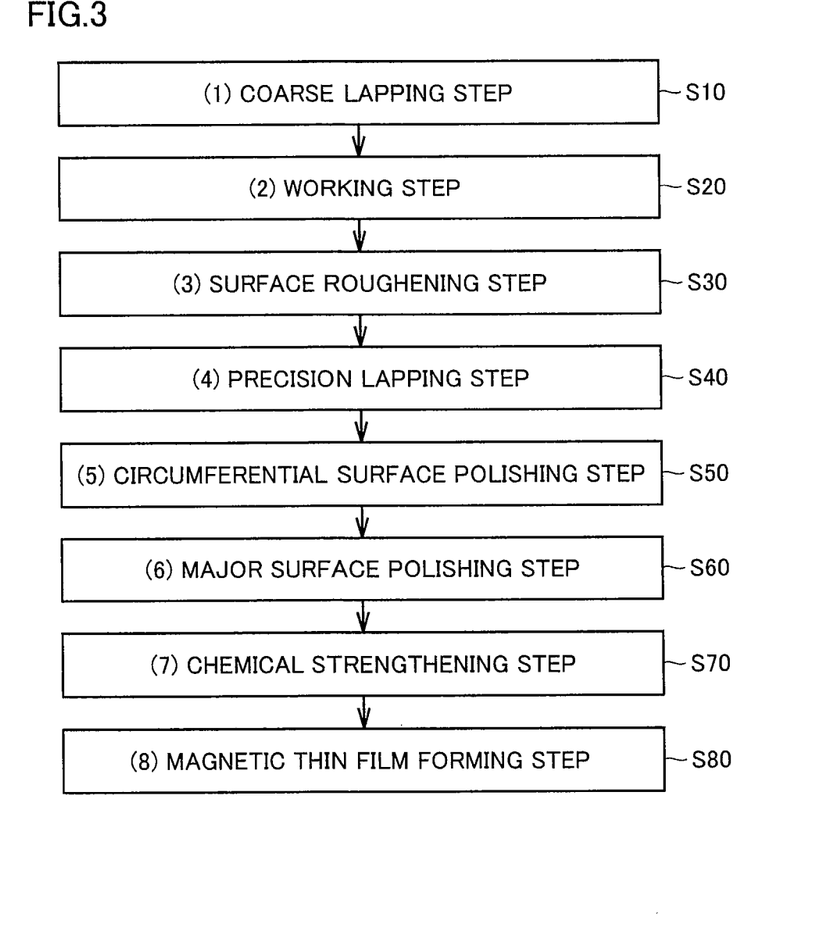
FIG. 3 is a flowchart of a method for producing a glass substrate in an embodiment.

With reference to FIG. 3 showing a flowchart, a method will be described for producing a glass substrate (for an information storage medium) in the present embodiment.

The method for producing a glass substrate in the present embodiment may be such that a glass substrate obtained through (1) a coarse lapping step (step S10), (2) a working step (step 20), (3) a surface roughening step (step 30), (4) a precision lapping step (step 40), (5) a circumferential surface polishing step (step 50), (6) a major surface polishing step (step 60), and (7) a chemical strengthening step (step 70), which corresponds to the FIG. 1 glass substrate 1, may undergo a magnetic thin film forming step (step S80). The magnetic thin film forming step (step S80) provides magnetic disk 10.

Hereinafter, steps S10-S80 will be described sequentially. Note that between steps S10-S80, a simple cleaning step is performed, which is not described herein.

(1) Coarse Lapping Step (Step S10)

Top, bottom and body dies were used to subject molten glass to direct press to obtain a glass substrate in the form of a disk having a diameter of 66 mmϕ and a thickness of 1.2 mm. The glass substrate was formed using a glass material for example of aluminosilicate glass. Other than direct press, downdrawing or floating may be employed to form a sheet of glass which may in turn be cut with a grinding stone to obtain a glass substrate in the form of a disk.

The aluminosilicate glass was a chemically strengthened glass having a composition of 58-75% by mass of $SiO_2$, 5-23% by mass of $Al2O3$, 3-10% by mass of $Li2O$ and 4-13% by mass of $Na2O$ as main components, and 0.1-2% by mass of cerium oxide ($CeO_2$).

The glass substrate was then lapped. This was done for improved dimensional and geometrical accuracies. This lapping step was performed with a double-sided lapping device, with abrasive grains having a grain size of #400 (particle diameter: approximately 40-60 μm). More specifically, a polishing device was employed with abrasive grains of alumina having a grain size of #400 and a top surface plate applying a load set at approximately 100 kg to finish the glass substrate, which is accommodated in a carrier, to have opposite surfaces having a profile irregularity of 0-1 μm and a surface roughness Rmax of approximately 6 μm.

(2) Working Step (Step S20)

A working step was then performed: More specifically, the outer and inner circumferential surfaces were ground to provide an outer diameter of 65 mm and an inner diameter, or a diameter of hole 1H located at the center, of 20 mm, and thereafter the outer and inner circumferential surfaces were chamfered as predetermined. The circumferential surfaces had a surface roughness of approximately 2 μm for Rmax. Note that, in general, a 2.5-inch type hard disk is produced with a glass substrate having an outer diameter of 65 mm.

(3) Surface Roughening Step (First Grinding Step: Step S30)

This surface roughening step was done in a mechanical method employing a surface polishing machine using a loose abrasive. The glass substrate was polished with the loose abrasive to have a surface entirely having a substantially uniform surface roughness (Ra=approximately 0.01-0.4 μm). The surface roughening step was done to achieve a target surface roughness, which is preferably determined in a relationship with a grain size of a bonded abrasive used in a precision lapping step described hereinafter.

(4) Precision Lapping Step (Second Grinding Step: Step S40)

In this precision lapping step, the glass substrate having a roughened surface had the major surface ground with a polishing pad having an abrasive bonded thereto. The precision lapping step was performed as follows: the glass substrate having a roughened surface was set in a lapping device and a diamond sheet was used to lap a surface of the glass substrate. This allowed the glass substrate to have a surface roughness Ra equal to or smaller than 0.1 μm and a flatness equal to or smaller than 7 μm.

The glass substrate that has its major surface roughened previously in the surface roughening step, allows the fine bonded abrasive to engage the major surface of the glass substrate. This can prevent the bonded abrasive from disadvantageously slipping on a surface of the glass substrate. In this case, the precision lapping step can achieve a high working rate from the beginning of polishing a surface.

(5) Circumferential Surface Polishing Step (Step S50)

The circumferential surface polishing step was performed as follows: While the glass substrate was rotated, it had the outer and inner circumferential surfaces brushed and thus polished to have surface roughness of approximately 0.4 μm and approximately 0.1 μm for Rmax and Ra, respectively. The glass substrate having the circumferential surfaces thus polished was then washed with water.

(6) Major Surface Polishing Step (First and Second Polishing Steps: Step S60)

The major surface polishing step was performed as follows: Initially, a first polishing step was performed with the aforementioned double-sided polishing device to remove flaws, distortion and the like that remain after the precision lapping step. In the first polishing step, a polishing pad that is a suede pad was used to polish the major surface of the glass substrate. A polishing agent was used that contained cerium oxide at a purity equal to or larger than 99% by mass for $CeO_2$/TREO, and had an alkaline earth metal content having a total mass equal to or smaller than 10 ppm by mass.

Furthermore, preferably, the polishing agent contains cerium oxide at a purity equal to or larger than 99.99% by mass for $CeO_2$/TREO and has an alkaline earth metal content having a total mass equal to or smaller than 5 ppm by mass.

Furthermore, the polishing agent preferably has a solid content with cerium oxide contained therein at a ratio equal to or larger than 90% by mass relative to the solid content.

Furthermore, for the polishing agent, a particle diameter having a maximum value equal to or smaller than 3.5 μm and a mean particle diameter (a D50 value) of 0.4-1.6 μm are preferable.

Furthermore, preferably, a polishing slurry that normally has a moisture content with the polishing agent dispersed therein is used, and it contains 3-15% by mass of cerium oxide.

Figure 4:
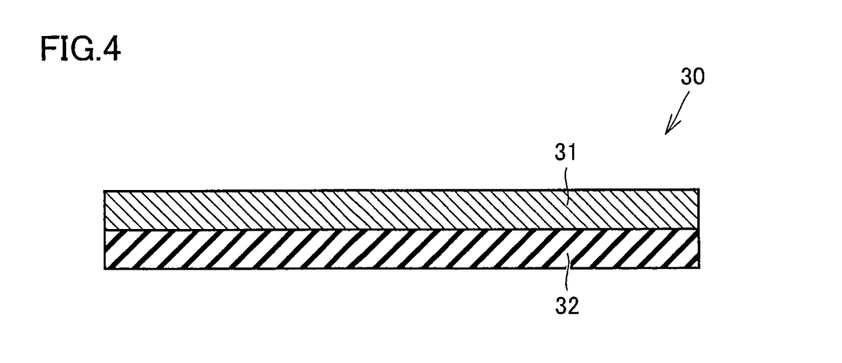
FIG. 4 is a cross section of a soft polishing pad used in a method for producing a glass substrate in an embodiment.

Furthermore, with reference to FIG. 4, the polishing is done with a soft polishing pad 30, which includes a base 31 and a nap layer 32 having a thickness of 430-620 μm preferably.

Then, the glass substrate was cleaned to remove the polishing agent thereon. This was done as follows: The glass substrate was held in a liquid having 1% by mass of HF and 3% by mass of sulfuric acid mixed together and in that condition the glass substrate was exposed to ultrasonic waves of 80 kHz. Thereafter the glass substrate was cleaned with a neutral detergent while exposed to ultrasonic waves of 120 kHz, and finally, the glass substrate was rinsed with pure water and then IPA-dried.

Preferably, glass substrate 1 is cleaned so that thereafter a total amount of alkaline earth metal that remains on its entire surface including the major and circumferential surfaces is equal to or smaller than 10 $ng/cm^2$.

Subsequently, glass substrate 1 underwent a second polishing step. In the second polishing step, a polishing pad that is a soft polisher (of suede) was used to polish the major surface of the glass substrate. Note that this step was done with a polishing agent of abrasive grains of silica finer than the cerium oxide used in the first polishing step.

(7) Chemical Strengthening Step (Step S70)

A chemical strengthening step was performed to chemically strengthen the glass substrate having undergone the major surface polishing step. Ions that are present on a surface of the glass substrate (e.g., Li+ and Na+ for aluminosilicate glass) were exchanged with those having a larger ionic radius (Na+ and K+).

Glass substrate 1 has a surface (e.g., from a surface of the glass substrate to a depth of approximately 5 μm) subjected to ion exchange with atoms having a large ionic radius to apply compressive stress to the surface of glass substrate 1 to enhance the substrate in stiffness.

Thus, (1) the coarse lapping step (step S10), (2) the working step (step 20), (3) the surface roughening step (step 30), (4) the precision lapping step (step 40), (5) the circumferential surface polishing step (step 50), (6) the major surface polishing step (step 60), and (7) the chemical strengthening step (step 70) were performed and as a result glass substrate 1 was obtained (see FIG. 1). Note that the second polishing step in the major surface polishing step may be performed after the chemical strengthening step.

(8) Magnetic Thin Film Forming Step (Step S80)

The chemically strengthened glass substrate, which corresponds to the FIG. 1 glass substrate 1, was then provided with a magnetic thin film layer on the opposite major surfaces (or one thereof). The magnetic thin film layer was provided by successively depositing an adhesion layer formed of a Cr alloy, a soft magnetic layer formed of a CoFeZr alloy, an orientation-controlled underlying layer formed of Ru, a perpendicular magnetic recording layer formed of a CoCrPt alloy, a C based protection layer, and an F based lubrication layer. The glass substrate thus provided with the magnetic thin film layer can be served as a perpendicular magnetic recording disk corresponding to the FIG. 2 magnetic disk 10.

The present embodiment provides a magnetic disk that is an example of a perpendicular magnetic recording disk configured of a magnetic thin film layer. The magnetic disk may be configured as a longitudinal magnetic recording disk and from a magnetic layer or the like.

Function and Effect

In the present invention, in the major surface polishing step (S60), an aluminosilicate based or similar glass substrate that contains $SiO_2$ in a relatively large amount has 2 with Si and O bonded via a covalent bond, while Ce has an electronic state that approximates to that of Si to some extent. Accordingly, $SiO_2$ has Si substituted by Ce. However, a Ce—O bond does not have as large covalent bondability as a Si—O bond, and accordingly, the substituted portion is destroyed by small force.

If the aluminosilicate glass itself contains cerium oxide ($CeO_2$), and the major surface polishing step is performed with a cerium oxide containing Ce polishing agent to polish the glass substrate, a Si—O bond can smoothly be substituted with a Ce—O bond to reduce the minute irregularity that would otherwise remain on a surface of the glass substrate.

This in turn allows the chemical strengthening step to process a surface of the glass substrate uniformly to provide a strengthened layer (a compression set layer) without variation.

Furthermore, if a hard polishing pad is used to polish the glass substrate, the polishing agent tends to remain on the substrate as the pad exerts pressure on the substrate. A soft polishing pad formed of suede or the like (a polisher) can minimize adhesion of a polishing agent of Ce to the substrate.

Note that the soft polishing pad is generally divided into a closed-cell system and an open-cell system depending on how it is foamed. The closed-cell system is foamed in a manner that prevents a polishing slurry from permeating the polishing cloth and thus allows the slurry to be present only between the glass substrate and the polishing cloth or at the contact interface, and accordingly, it is believed that in general, for a given working pressure, the slurry can be used at a reduced flow rate. The closed-cell system includes a bubble mixed type and a no bubble type.

The open-cell system generally includes nonwoven fabric as a base material and the nonwoven fabric has an entanglement of fibers with a variety of types of resin impregnated therein to serve as a binder of fibers and the resin phase per se has an open-cell structure. In contrast to the closed-cell system, the open-cell system allows a polishing slurry to permeate the polishing cloth. The closed-cell system includes polishing cloth of suede and that with nonwoven fabric serving as a base material (of coagulated polymer and of a coagulated and set type).

Inter alia, a polishing pad of suede is used when the glass substrate is precision-polished. Polishing cloth of suede is produced for example as follows: Knitted/woven fabric of natural fiber, recycled fiber or synthetic fiber, non woven fabric, or the Knitted/woven fabric/non woven fabric with styrene-butadiene rubber, nitrile butadiene rubber or a similar rubber material or polyurethane elastomer or a similar resin introduced therein is used as a base material, and a solution of polyurethane elastomer is applied thereto, treated with a liquid coagulant and thus wet-coagulated to provide a porous, grain side layer. The intermediate product is then washed with water and dried and subsequently has the grain side layer's surface polished with sand paper or a similar polisher to have pores that are uniform in geometry as seen at the surface and are perpendicular to a surface of a base and uniformly fusiform in cross section.

EXAMPLES OF INVENTION AND COMPARATIVE EXAMPLES

Figure 5:
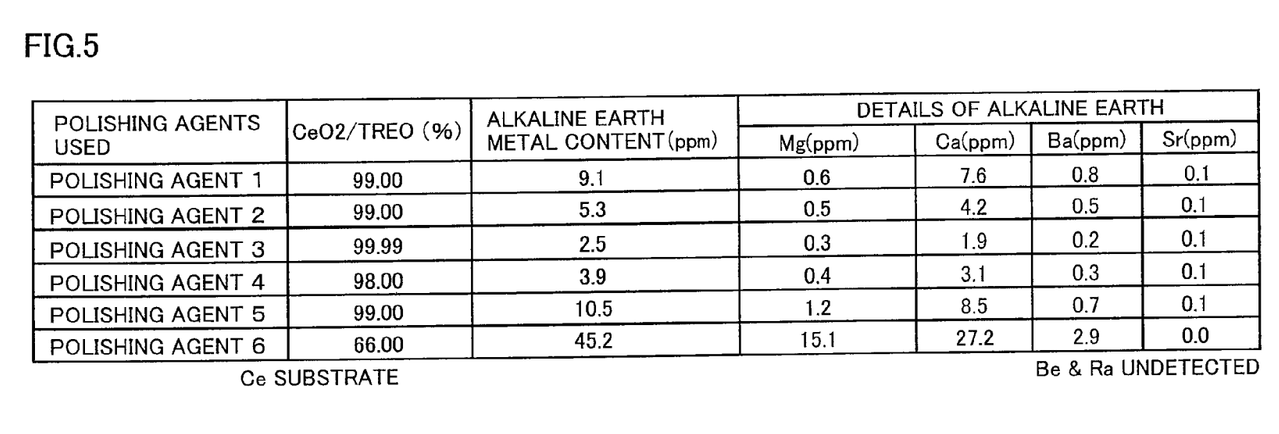
FIG. 5 is a table of components of polishing agents 1-6 used in examples.
Figure 6:
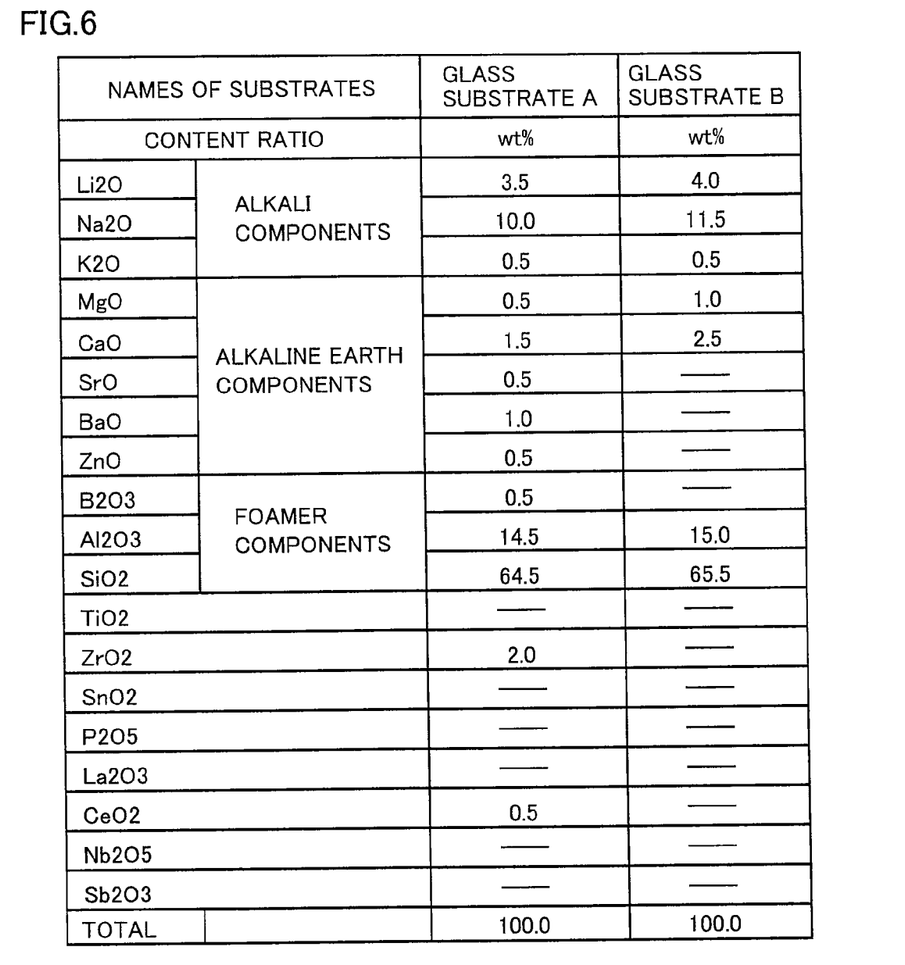
FIG. 6 is a table of components of a composition of a glass substrate A and those of a composition of a glass substrate B used in examples.
Figure 7:
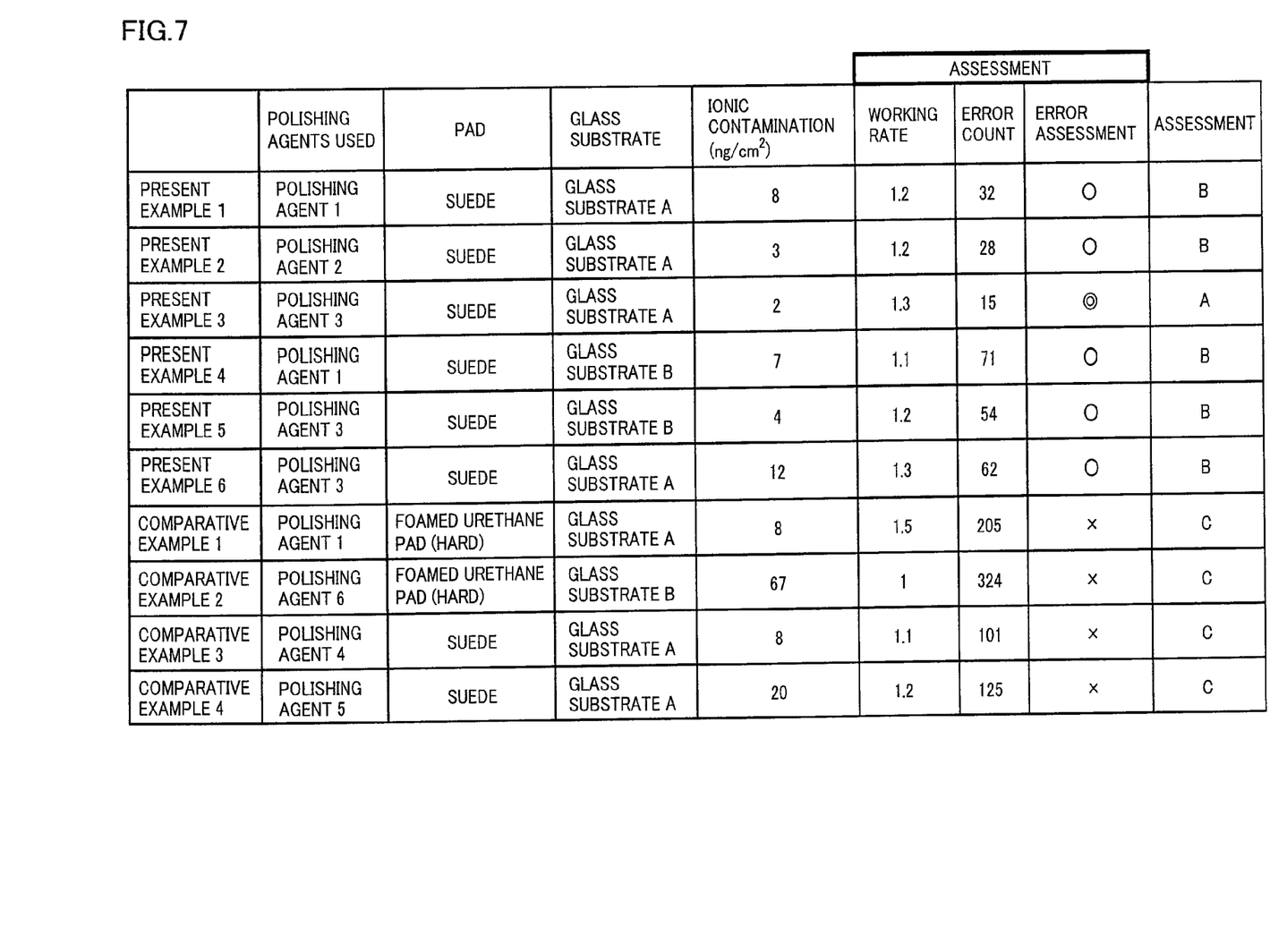
FIG. 7 shows a result of an assessment of examples 1-6 of the present invention and comparative examples 1-4.

Hereinafter, reference will be made to FIGS. 5-7 to describe the major surface polishing step in examples 1-6 of the present invention and comparative examples 1-4. FIG. 5 is a table of the components of polishing agents 1-6 used in the first polishing step in the examples of the present invention. FIG. 6 is a table of components of a composition of a glass substrate A and those of a composition of a glass substrate B used in the examples of the present invention. FIG. 7 shows a result of an assessment of examples 1-6 of the present invention and comparative examples 1-4.

The FIG. 5 polishing agents had a D50 value (a mean particle diameter) of a value of 0.6. Furthermore, the polishing agent preferably had a solid content with cerium oxide contained therein at a ratio of 92% relative to the solid content.

The assessment was done as follows: The glass substrate was mounted on a hard disk drive having the DFH mechanism, and the head was flown in an amount of 2 nm, while data was read and written (information) and it was determined whether the data was read and written without error. On the hard disk drive any portion of 0-90 degrees centigrade had its entire surface subjected to read and write and an error point was analyzed with a scanning analytical electron microscope (SEM/EDX), and in doing so, flaws having a width equal to or larger than 100 nm and less than 1 μm were quantitatively counted.

Examples 1-5 of the present invention employed The FIG. 6 polishing agents, pads, and glass substrates. Example 6 of the present invention was done with a cleaning step without using sulfuric acid and instead using 1% of HF only. Comparative example 1 employed a hard pad indicated in FIG. 7 (a foamed urethane pad). Comparative example 2 employed a hard pad indicated in FIG. 7 (a foamed urethane pad) with a working rate set at 1. Comparative examples 3 and 4 provided polishing under a condition similar to that of example 1 of the present invention except that polishing agents 4 and 5 were used, respectively. For the assessment, examples 1-6 of the present invention and comparative examples 1-3 were done each using three glass substrates, and their average value was calculated.

Note that a "working rate" is a period of time required to achieve any amount of machining allowance, and it is set as 1 for using polishing agent 1 and the hard pad and the other examples of the present invention and the comparative examples were compared therewith and thus relatively assessed. Note that working rates larger than 1 indicate faster working speed and increased working efficiency.

Furthermore, FIG. 7 indicates ionic contamination, which was done by immersing each glass substrate in 20 ml of ultrapure water of 18MΩ·cm or larger (at 20 degrees centigrade) and leaving the substrate therein still for 10 minutes. During the ionic contamination, the ultrapure water was not agitated. Furthermore, while the operation was performed, the container had its lid closed, and furthermore, the operation was done in a room of class 100. After a period of time of 10 minutes has elapsed, the substrate was alone removed and an extract was measured with an ion chromatograph. The ion chromatograph employed was ICS-2100 produced by Nippon Dionex K.K.

As shown in FIG. 7, the assessment provided a result indicating that example 3 of the present invention was excellent for both "working rate" and "error count" and thus obtained an assessment of "A". Examples 1, 2 and 4-6 of the present invention obtained an assessment of "B". Comparative examples 1-4 all obtained an assessment of "C".

Furthermore, from the above result, it is recommendable that the glass substrate preferably has a composition including 0.02-1% by mass, more preferably 0.05-0.8% by mass, still more preferably 0.1-0.6% by mass of Ce. Furthermore, preferably, the polishing agent contains cerium oxide at a purity equal to or larger than 99.99% by mass for $CeO_2$/TREO, and has an alkaline earth metal content having a total mass equal to or smaller than 5 ppm by mass. Furthermore, the polishing agent preferably has a solid content with cerium oxide contained therein at a ratio equal to or larger than 90% by mass relative to the solid content.

Furthermore, it is preferable that after the glass substrate is polished it should be cleaned so that a total amount of alkaline earth metal that remains on its entire surface including the major and circumferential surfaces, or ionic contamination, is equal to or smaller than 10 $ng/cm^2$.

Thus conventionally there has been a demand for hard disks having higher density, and accordingly, media and glass substrates are required to have a significantly high level of surface accuracy and cleanliness. A glass substrate which has undergone the polishing step using cerium oxide and thereafter requires the chemical strengthening step has a surface mechanically damaged by the cerium oxide step and this has an effect on the chemical strengthening process to induce alteration and degradation of a recording surface, and if the chemical strengthening step is followed by a finishing, precision polishing step, the finishing step cannot provide sufficient correction, and this effect also remains on a recording surface of a medium produced using the substrate, which makes it difficult to achieve steady recording and reproduction with low flying height.

In contrast, the examples of the present invention provide a production process that employs a polishing material of high purity cerium and a polishing pad (or cloth) of suede. Cerium oxide's steady and significantly efficient polishing property is ensured, and concurrently, using the polishing pad that is of material of low elasticity can prevent/alleviate excessive, mechanical stress concentration and contribute to limited mechanical damage on a surface.

Specifically, impurity (alkaline earth metal) inhibits polishing reactivity and inhibits a significantly efficient chemical reaction. High purity cerium allows a significantly efficient process, and a hard polishing pad, such as foamed polyurethane, that has conventionally, essentially been required in ensuring working machining allowance and speed can be dispensed with and a polishing pad of suede that is low in elasticity and can reduce/prevent mechanical damage is now applicable.

Conventionally, when a substrate is chemically strengthened, heat and ion exchange stress induce and amplify defect, fine undulation and the like on a surface of the substrate. The present invention can prevent such defects from arising frequently and severely and maintain them at a level that can be sufficiently removed and corrected by the finishing, polishing step, and consequently, the present invention can provide a substrate having a significantly good surface quality.

While the present invention has been described in an embodiment and examples, as above, it should be understood that the embodiment and examples disclosed herein are illustrative and non-restrictive in any respect. The scope of the present invention is defined by the terms of the claims, and is intended to include any modifications within the scope and meaning equivalent to the terms of the claims.

Reference Signs List

1: glass substrate; 1A: front major surface; 1B: back major surface; 1C: inner circumferential surface; 1D: outer circumferential surface; 1H: hole; 2: magnetic thin film layer; 10: magnetic disk.

The invention claimed is:

1. A method for producing a glass substrate for an information storage medium including a glass substrate and a magnetic recording layer on a major surface of said glass substrate, comprising:
polishing said major surface of said glass substrate with a polishing agent applied thereon, wherein said glass substrate is aluminosilicate glass wherein said glass substrate comprises a composition including 0.02-1% by mass of Ce and said polishing comprises coarse polishing and subsequent finishing polishing; and
chemically strengthening said major surface of said glass substrate, wherein said chemically strengthening occurring subsequent to said coarse polishing;
during said coarse polishing, said polishing agent comprising cerium oxide at a purity equal to or larger than 99% by mass for $CeO_2$/TREO and comprising an alkaline earth metal content having a total mass equal to or smaller than 10 ppm by mass, wherein TREO regards a total amount of rare earth oxide element/elements,
said coarse polishing being performed with a soft polishing pad to polish said glass substrate.

2. The method for producing a glass substrate for an information storage medium according to claim 1, wherein said polishing agent in said coarse polishing comprises cerium oxide at a purity equal to or larger than 99.99% by mass for $CeO_2$/TREO, and comprises an alkaline earth metal content having a total mass equal to or smaller than 5 ppm by mass.

3. The method for producing a glass substrate for an information storage medium according to claim 1, wherein said polishing agent in said coarse polishing comprises a solid content with cerium oxide contained therein at a ratio equal to or larger than 90% by mass relative to said solid content.

4. The method for producing a glass substrate for an information storage medium according to claim 1, wherein said polishing agent in said coarse polishing has a particle diameter having a maximum value equal to or smaller than 3.5 μm, and a mean particle diameter (a D50 value) of 0.4-1.6 μm.

5. The method for producing a glass substrate for an information storage medium according to claim 1, wherein:
a polishing slurry comprising a moisture content and comprising said polishing agent in said coarse polishing dispersed in said moisture content is employed; and
said polishing slurry comprises 3-15% by mass of cerium oxide.

6. The method for producing a glass substrate for an information storage medium according to claim 1, wherein:
said soft polishing pad comprises a base and a nap layer; and
said nap layer has a thickness of 430-620 μm.

7. The method for producing a glass substrate for an information storage medium according to claim 1, comprising after said polishing cleaning said glass substrate so that a total amount of alkaline earth metal that remains on an entire surface, including said major surface, of said glass substrate and a circumferential surface of said glass substrate is equal to or smaller than 10 $ng/cm^2$.

* * * * *